Figure 1:
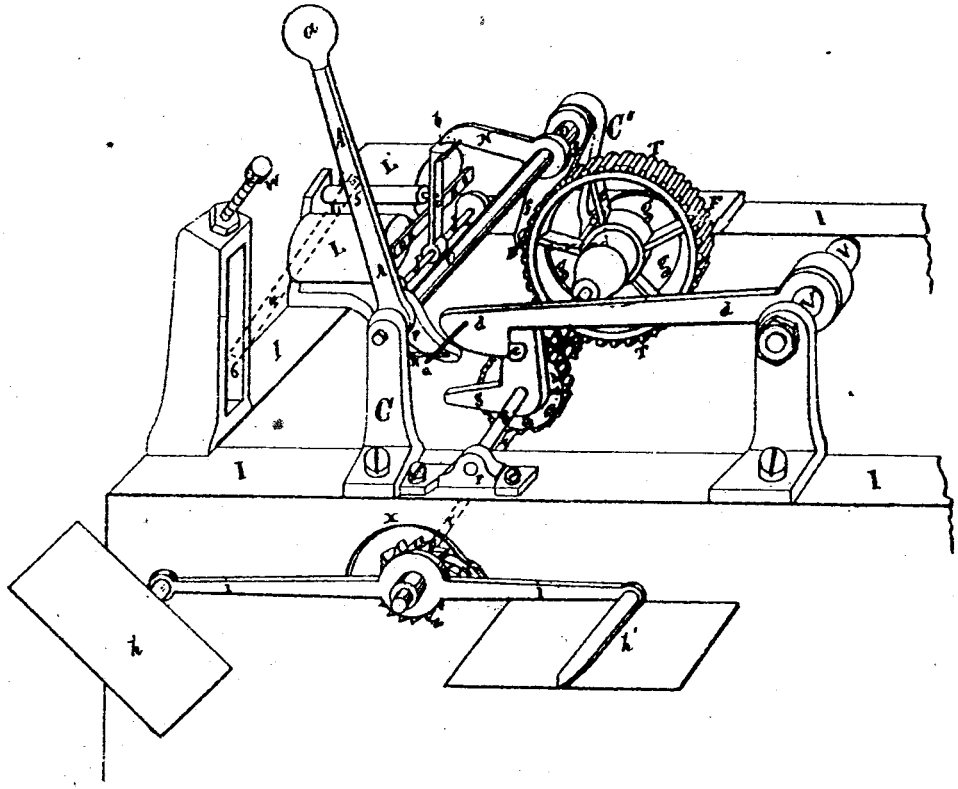

2 Sheets--Sheet 1.
M. G. FARMER.
Electro-Magnetic Fire-Alarm Apparatus.
No. 6,244. Reissued Jan. 19, 1875.
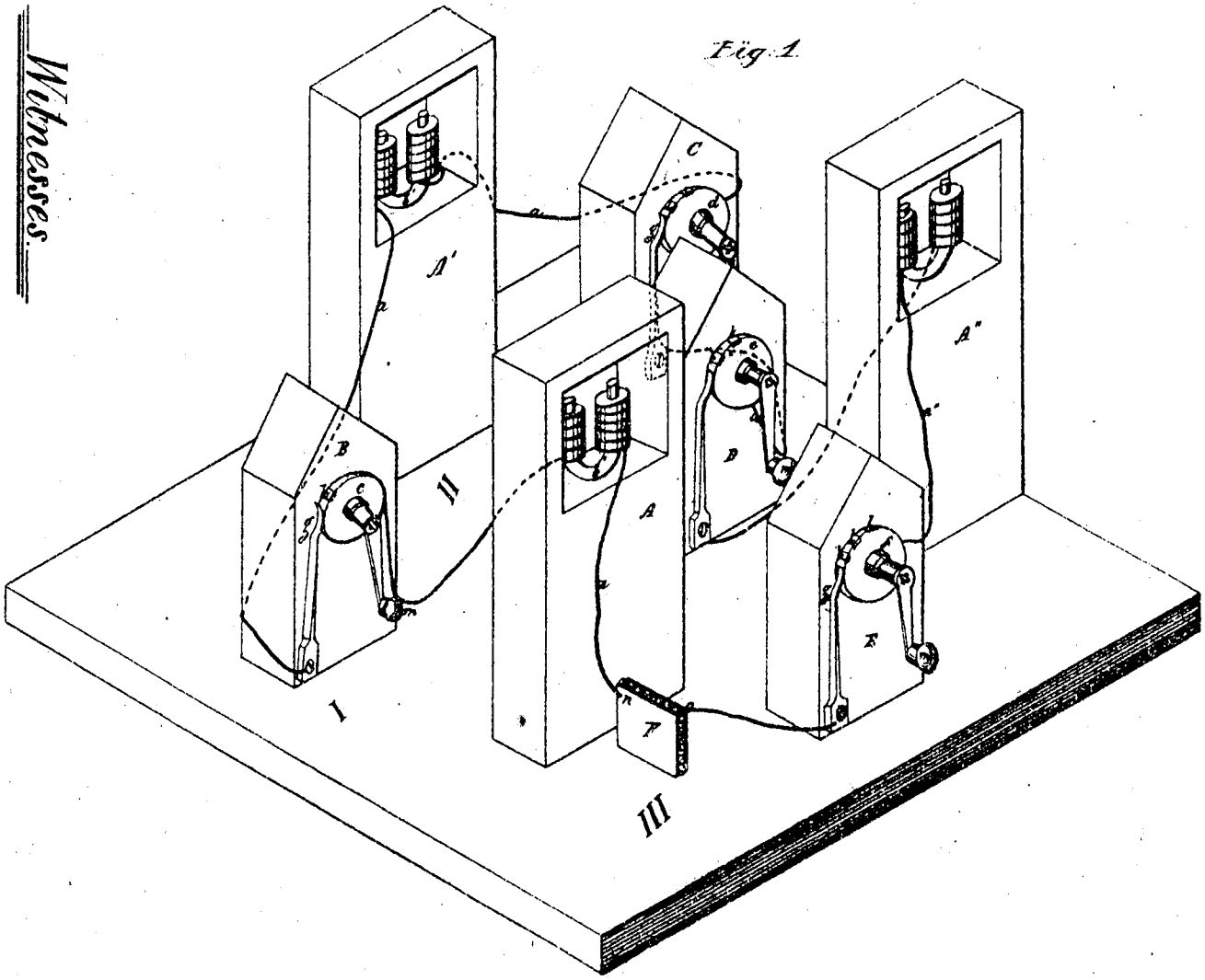
Witnesses.
T. C. Smith
Harry Coleman.
Inventor.
Moses G. Farmer.
By J. P. Ketchum Atty 2 Sheets--Sheet 2.

M. G. FARMER.

Electro-Magnetic Fire-Alarm Apparatus.

No. 6,244. Reissued Jan. 19, 1875.

Witnesses

T. C. Smith

Harry Coleman

Inventor

Morris G. Farmer

By J. P. Hoch his atty.

6,244. ELECTRO-MAGNETIC FIRE-ALARM APPARATUS. M. G. Farmer, Salem, Mass. Patent No. 23,060, dated Feb. 22, 1859; extended seven years. [Filed Dec. 18, 1874.]

*To all whom it may concern:*

Be it known that I, MOSES G. FARMER, of Salem, in the county of Essex, in the State of Massachusetts, have invented a new and Improved Town Fire-Alarm Telegraph; and I do hereby declare that the following is a full and exact description thereof, reference being had to the accompanying drawings and to the letters of reference marked thereon.

The nature of my improvement consists in the combination, in the same electric circuit, or in dependent electric circuits, of two or more circuit-wheels or equivalents, adapted to give determinate and different signals, with one or more electro-mechanical sounding mechanisms, the circuit-wheels being constructed and organized to control the circuit, to cause the production, by the mechanical sounding mechanism, uniformly, and only at each complete revolution or movement of the wheel, of a determinate series of audible sounds, and the sounding mechanism being so constructed, organized, and connected with the circuit that by the breaking or closing of the circuit an independent mechanical force is brought into action for the giving of audible signals.

To enable others skilled in the art to make and use my invention, I will proceed to describe its construction and operation.

In the fire-alarm telegraph now in operation, for which Letters Patent were granted to me in connection with William F. Channing, of Boston, on the 19th of May, 1857, and to which reference is here made, a signal-circuit, so called, is employed to convey the information of a fire from any part of the area of a city to its central telegraph-station, where it is received by an operator. Another circuit, called an "alarm-circuit," connects the same central station with electro-mechanical telegraph striking or alarm machinery. At the center station is placed a key-board or other apparatus, for the purpose of completing and breaking the circuit at suitable intervals, so as to strike a definite alarm upon the alarm-bells.

The operator, with this machinery, is enabled to receive information of the existence and locality of a fire by means of the signal-circuit, and then, by an act of intelligence and volition, to strike a corresponding definite alarm on the alarm-bells by means of the key-board or other apparatus, placed in the alarm-circuit, so called. This system requires the expense of a central office, and of an operator always on the spot.

By my present improvement I can dispense with the central office and unite the functions of both the signal and alarm circuits in one fire-alarm circuit provided with suitable apparatus.

The drawing, Divisions I, II, III, represents a fire-alarm telegraph embodying my invention.

The fire-alarm circuit consists of telegraph-wires insulated in the ordinary way. This is represented by the lines *a a′ a″*, continuous or dotted. Three alarm mechanisms are represented by A A′ A″, containing electro-magnets *b b′ b″*, or their equivalents, which are included in the fire-alarm circuit *a a′ a″*.

These electro-magnets are here described and understood as forming part of my electro-magnetic escapement and apparatus, called "Improvement in Magnetic Alarm-Bells," for which Letters Patent of the United States were granted me May 4, 1852, which said improvements are described and shown in the schedule and drawings forming part of said Letters Patent, being in part as follows, the drawings therein referred to being hereto attached and marked Figure 1, Sheet II.

"My invention consists of mechanism of peculiar construction, which is put in operation by electro-magnetism, and so combined with a train of wheel-work, cams, spring, weights, and a hammer as to cause successive blows to be struck upon a bell any required number of times; the main feature of the invention consisting in this, that I am enabled by its use to bring into action any desirable amount of force, either of gravity, of a spring, of currents of air, or of steam, and control the duration of the same by the electro-magnet.

Fig. 1 is a perspective view of that part of the machine which constitutes my invention, termed, in the subjoined description, the liberating apparatus. * * * *

In Fig. 1 * * * the frame of the machine is shown at I I. An electro-magnet, L L′, Fig. 1, is placed, in a horizontal position, near to one end of the machine. An upright bar, *c*, having its center of motion upon the rocker-shaft J, is attached to the armature K of the magnet. The top of the bar *c* is made sufficiently broad to allow the end of the arm N to rest upon it at *b*, the opposite end of the arm N being firmly affixed to the rocker-shaft O O, which is supported by the upright stands C C′. To the same shaft O O there are also affixed three arms or levers, A, P, and *f*. A is an arm, which may be about ten inches in length, having a weight, *a*, at its upper end. This ball or weight is not vertical with the rocker-shaft O, to which it is attached, but is inclined at such an angle as to insure its fall whenever the horizontal bar N is not supported by the upright bar *c*. The distance through which the bar A is allowed to fall is regulated by the rest W. The arm P may be two or three inches in length, and is affixed to the rocker-shaft O in such a position as to act upon the end of the horizontal latch-shaped detent *d* and raise it from the pin or stud *e*. The detent *d* is supported at one end by a stud, V, upon which it turns. The opposite end carries a pin, Q, which falls upon another pin or stop, H, attached to the stand C, and prevents the detent *d* from falling lower than is necessary. The arm *f*, also firmly fastened to the rocker-shaft O, has at its lower end a stud or pin, D, placed in such a position as to come in contact with the cam *g g'*, as hereinafter described. The horizontal shaft E E, which is supported in the stands F F, placed upon opposite sides of the frame I I, carries the dog S, the pinion G, the gear T, and the cam or wiper *g*, all of which are firmly secured to the shaft by splines or other suitable device. The cam *g'* may be of about the same form shown in the drawings, its shape being such as to insure (by the intervention of the stud D, the bar *f*, and the rocker-shaft O) the elevation of the arm and ball A *a* to the required height, and at the same time allow it to fall upon the rest W. The pinion U, placed below the gear T, and driven by it, gives motion, by means of the horizontal shaft *r*, to the vane or fan *h h'*, which may be placed outside of the frame I. The bar *i i*, to the opposite ends of which the vanes *h h'* are fastened, turns freely upon the shaft *r*. It carries a pawl, *y*, and spring X, so placed that the pawl may play in the ratchet Z, which is firmly fixed to the shaft.

The pinion G forms a connection between the mechanism above described and the common striking apparatus of a tower-clock. Upon the latter machine I claim no improvements, as my invention relates exclusively to the liberating apparatus, as hereinbefore stated.

* * * * The pinion G * * * * * * plays in the gear T, * * * * by which a connection is established between the striking part of the mechanism and the liberating apparatus. The action of the weight M causes the shaft E and the attached dog S to revolve in the direction of the arrow *m*. When the machine is adjusted and in readiness for action, the detent *d* bears upon the stud *e* in the dog S, and prevents the weight M, which moves the striking-hammer, from falling. The velocity of rotation of the dog S is such as to allow time for one stroke of the hammer upon the bell at each of its revolutions.

To set the mechanism herein described in motion, a current of electricity, generated by a suitable battery, is passed through the coils of the magnet L L', the armature K is attached to the magnet, the upright arm *c* moves with it, the horizontal arm N is no longer supported, and the weighted arm A falls over until stopped by the adjustable rest W in front of it. In falling, the lever P raises the latch-shaped detent *d*. The dog S, carrying the pin *e*, attached to the same axis with the cam *g'*, and connected with the train of wheels of the striking machinery, is thus liberated, and begins to revolve. In so doing the cam *g'* revolves and swings forward the bar *f*, attached to the axis of the falling arm A, which is thus raised to its original position. The horizontal lever N catches again at *b*. If the armature has been released, the detent *d* falls and comes in contact with the pin *e*, thus arresting the dog S at the end of one revolution. This occupies one or two seconds, and in the meantime the weight M has fallen a short distance, and a single blow has been struck by the hammer upon the bell. If the armature K were not released from the attraction of the electro-magnet, the horizontal lever N would not catch at *b*, and the machine would continue to strike until the circuit influencing the electro-magnet was interrupted. The dotted lines in drawings show the position of a spring, 4, of india-rubber, or other elastic material, one end being attached at 5 to the falling arm A, and the other end fastened to the frame of the machine, as at 6. As the arm rises the spring is extended; as it falls its velocity is increased by the contraction of the spring.

It is obvious that either the weight *a* or the spring 4 may be used separately, or their action may be combined, as above described."

Any other equivalent electro-mechanical mechanism may be employed.

It will, of course, be understood that in employing the said striking mechanism in connection with the circuit and circuit-wheel shown in the drawings, Sheet I, and hereinbefore described, the magnet *b b' b''* in the latter corresponds to the magnet L in the former. It will also be understood that the said magnets *b b' b''* form a part of any suitable device for liberating alarm mechanism.

It is well known that the armature of an electro magnet in its reciprocating motion is drawn toward or held to the magnet when the electric circuit is closed, and that it is drawn back from the magnet by the reacting power of a spring when the electric circuit is broken. In a closed-circuit arrangement, these motions are accomplished by the reaction of the spring, which in an open-circuit arrangement would be accomplished by the electro-magnetic force.

In my electro-magnetic escapement referred to above in an open-circuit arrangement, the weighted arm is tripped by the withdrawal of the armature by the direct force of an electro-magnet. In a closed-circuit arrangement in an equivalent action, the weighted arm is tripped by the withdrawal of the armature from the electro-magnet by the reactive force of a spring when the circuit is interrupted. The two methods are equivalent; but I describe the closed-circuit arrangement here, so that any person skilled in the art may construct the whole of my system from this specification and the reference herein made.

The essential characteristic of the electro-mechanical sounding mechanism to be employed is that the breaking or closing, as the case may be, of the electric circuit with which it is connected brings into action an independent mechanical force which may be much greater than the magnetic force developed in the circuit and employed to set the said mechanism in motion, and that the said circuit is controlled by the circuit-wheel to occasion the producing by the said mechanism uniformly at each complete revolution or movement of the circuit-wheel a determinate series of audible signals.

Four distinct signal-boxes are represented in an elementary form at B C D E. These consist of circuit-wheel *c d e f*, on which springs *g* always bear, completing the fire-alarm circuit, except when one of the ivory segments *h i k l* passes under one of the springs *g* in the course of the revolution of the circuit-wheel, breaking the circuit at such times, and giving automatic signal according to their number and arrangement. For instance, in a signal-box, two such circuit-wheels might be embraced, in causing one of which to revolve one arbitrary signal might be automatically given, and on causing the other of which to revolve another automatic signal, such as I II, might be given. The circuit-wheels in the drawings are represented with weighted handles *m*, which keep them in such position that the circuit is always closed when they are at rest. The circuit-wheels can be revolved by the hand applied to said handles; but for actual service the circuit-wheel is carried by clock-work with greater regularity than it can be moved by hand, and will be liberated by depressing a key. The number of ivory segments on each circuit-wheel will correspond with the number of the ward or district of the town in which it is placed, or to the number designating the signal-box itself, the boxes thus giving determinate and different signals, each box signalizing its own number, or other designation of itself.

The circuit-wheel and actuating mechanism may be inclosed in an iron box, B C D E, with a door which may be locked. As an additional precaution against an accidental interruption of the circuit from imperfect contact between the circuit-wheel *d* and the spring *g*, the shutting of the door of the signal-box may be made to close the circuit by pressing a spring connected with one wire of the circuit against an insulated anvil connected with the other wire of the circuit. The fire-alarm circuit is made to inclose the signal-box E by connecting one wire, *a'*, of the circuit with the base of the spring *g*, and the other wire, *a''*, of the circuit with the stud supporting the circuit-wheel *f'*, and it is made to include the other signal-boxes in a similar way. It passes also through all the electro-magnets *b b' b''* in the electro-mechanical alarm mechanism, and connects with the two poles *n* and *o* of the battery, and thus makes continuous a communication or circuit through the battery, the electro-mechanical alarm mechanism, and signal-boxes contained in the system. A galvanic battery, F, or other source of electricity included in the circuit, may be placed at any convenient point.

Having thus described the several parts of my improvement, I will now describe them in their mutual dependence and operation. The battery F being placed in action, a closed circuit is established through the fire-alarm circuit-wires *a*, the weighted handles *m* keeping the circuit closed through the circuit-wheels *c d e f*. The electro-magnets *e e' e''* in the electro-mechanical alarm mechanism are thus continuously charged with magnetism while the system is at rest. An armature placed before the poles of each of the electro-magnets is thus permanently near to or in contact with the electro-magnets while the circuit remains closed, and if such armatures are suitably connected with the several electro-mechanical alarm mechanisms, such mechanisms will also be held at rest while the circuit remains closed.

If a fire now occurs near, say, signal-box E, the circuit-wheel *f* is set in motion by an authorized person. As the ivory segments *l l l* pass under the spring *g*, the fire-alarm circuit is momentarily interrupted, and the armatures in the electro-mechanical alarm mechanisms are released, and the said mechanisms give one signal for each interruption. The bells at A A' A'' are each struck three blows, a suitable interval elapsing between the series each time that the circuit-wheel *f* is revolved. An alarm is thus given, instantaneously indicating the locality of the fire.

Instead of an electro-magnet in the alarm-stations, an axial bar moving in a coil, or any other equivalent device, may be used. In the circuit-wheels *c d e f*, any non-conducting substance may replace the ivory segments, or segments may simply be cut out of the circuit-wheels at corresponding places, or any otherwise equivalent form of circuit-wheel used.

If a town is large, and it is desirable therefore to divide the fire-alarm circuit into two or more circuits, this can be done by making them mutually dependent, so that operating one will operate all the others. In this case there must be a battery in each circuit, and a relay at the point of connection between two mutually-dependent circuits, constructed so as to operate equally well both ways, in a manner similar to that for which Letters Patent of the United States were granted to me on the 29th day of January, 1856.

What I claim as my invention, and desire to secure by Letters Patent, is—

The combination, with the same electric circuit, or dependent circuits, of two or more signal-boxes, constructed to operate substantially as described, and one or more electro-mechanical alarm mechanisms, constructed to operate substantially as described, as shown and specified.

In witness I have hereunto set my hand this 25th day of November, 1874.

MOSES G. FARMER.

Witnesses:

J. P. FITCH,

J. N. GARNAWELL.